United States Patent [19]

Farmwald et al.

[11] Patent Number: 5,179,670
[45] Date of Patent: Jan. 12, 1993

[54] SLOT DETERMINATION MECHANISM USING PULSE COUNTING

[75] Inventors: Paul M. Farmwald, Berkeley; Timothy S.-C. Fu, Fremont, both of Calif.

[73] Assignee: MIPS Computer Systems, Inc., Sunnyvale, Calif.

[21] Appl. No.: 444,633

[22] Filed: Dec. 1, 1989

[51] Int. Cl.$^5$ ............................................. G06F 13/00
[52] U.S. Cl. .................................... 395/325; 395/275; 364/232.7; 364/229.4
[58] Field of Search ............................... 395/325, 275

[56] References Cited

U.S. PATENT DOCUMENTS

| | | | |
|---|---|---|---|
| 4,604,689 | 8/1986 | Burger | 364/200 |
| 4,896,288 | 1/1990 | Gonnering et al. | 364/900 |
| 5,048,009 | 9/1991 | Conrad | 370/17 |

Primary Examiner—Lawrence E. Anderson
Attorney, Agent, or Firm—Townsend and Townsend

[57] ABSTRACT

A slot determination mechanism wherein a number of bus units establish their positions along the bus and the total number of units on the bus. The units are connected in a bidirectional daisy chain. A one-cycle reset pulse is sent downstream to unit 1 (the upstream unit). Each unit on receiving one or more pulses from upstream sends that many plus one pulses downstream and then sends a one pulse upstream. Each unit then transmits upstream whatever it receives from downstream. The number of pulses received from upstream provide the slot number. The total number of pulses received from upstream and downstream provide the total number of units.

12 Claims, 6 Drawing Sheets

SLOT DETERMINATION MECHANISM USING PULSE COUNTING

BACKGROUND OF THE INVENTION

The present invention relates generally to bus communications, and more particularly to a system wherein functional units coupled to a bus are able to determine their relative positions on the bus.

A bus system provides a structure and a set of communication paths over which a plurality of functional units may send signals to one another. Typically, the signal lines include a common set of signal lines to which the functional units are connected in parallel. The bus system may also include a number of private lines that provide communication paths between particular functional units.

The signal lines are often implemented as generally parallel traces on a printed circuit board, known as a backplane. In this configuration, the functional units are built on circuit boards, which plug into connectors (slots) that extend across the backplane traces and hold the boards perpendicular to the backplane.

Each functional unit on the bus must have a unique address, which should depend only on the physical slot into which the board is placed. For consistency, the units will be numbered from 1 to N with unit 1 being leftmost. Movement to the right will be considered downstream, to the left upstream.

One way of providing slot numbers is to provide a special set of lines, and have each slot connect with only certain of the lines to define a binary code that is representative of that slot's position along the bus. In general, if there are N slots, there should be $\log_2 N$ (rounded up to the next highest whole number) lines. Thus in a system having up to 16 functional units, four lines would be dedicated to providing each slot with its unique address. However, backplane traces represent a scarce resource and this technique can be wasteful. Moreover, this technique does not provide a functional unit with the information relating to the total number of units in the system (i.e., the highest address).

An alternative to having dedicated backplane traces defining the bus slot addresses is to provide each unit with a set of user settable switches. At the time of connecting the units to the backplane, the switches are set to a configuration that defines the appropriate binary address. Clearly, the system is prone to human error. Moreover, the system provides no information as to the total number of functional units in the system.

SUMMARY OF THE INVENTION

The present invention provides a mechanism wherein each functional unit connected to the bus can determine its own position on the bus and also determine the total number of units on the bus. The invention requires that each unit make only two connections to the backplane to implement the slot determination.

Each unit has two extra signal connections, BusLeft and BusRight. The BusLeft for unit 1 is connected to a reset signal, and the BusRight for each unit is connected to the BusLeft of the unit immediately to its right. The BusRight for the rightmost unit is left unconnected. BusLeft and BusRight are bi-directional in that the unit can listen on or drive each.

In brief, each unit participates in a downstream (or forward) transfer that provides those units downstream with enough information to determine their relative positions, and in an upstream (or reverse) series of transfers to provide those units upstream with enough information to determine the total number of units. This is accomplished by receiving a number of pulses from upstream, sending a modified number downstream, receiving a number of pulses from downstream, and sending a modified number of pulses upstream.

In a preferred embodiment, each unit implements the following protocol. Upon seeing its BusLeft go to a 1 (logical true), it proceeds to drive a 1 on its BusRight, commencing with the following cycle, and maintains this 1 for one cycle longer than the 1 on BusLeft. The unit counts the number of cycles that BusLeft is 1. Thus, if BusLeft remained at 1 for n cycles, a 1 is driven on BusRight for n+1 cycles. Additionally, when BusLeft falls to 0 for one cycle (logical false), the unit drives a 1 on its BusLeft for one cycle. The unit stops driving BusRight, commences listening on BusRight, and counts the number of cycles that BusRight is 1. This number, when added to the number of cycles that BusLeft was 1, gives the total number of units in the system.

Thus, when a reset pulse of exactly one cycle duration is applied to BusLeft of unit 1, the unit drives a 1 on BusRight for two cycles and then drives a 1 on BusLeft for one cycle. The one-cycle reset pulse tells unit 1 that it is indeed in the first slot.

Unit 2 receives the two-cycle pulse from unit 1, drives a 1 on BusRight for three cycles, drives a 1 for one cycle on BusLeft, and listens on BusRight and drives on its BusLeft what it received on its BusRight, delayed by one cycle.

Accordingly, once the unit has received a number of cycles of 1 on BusLeft, it knows its position from the number of cycles. Moreover, since each unit sends one cycle of 1 upstream and echoes such cycles received from downstream boards, the number of one-cycle pulses tells the unit how many units are downstream.

Once unit 1 detects three cycles of 0 on BusRight, it knows that there are no more pulses coming in, and it sends an acknowledge pulse on the bus, which synchronizes all the processors and allows the reset sequence to continue.

A further understanding of the nature and advantages of the present invention can be realized by reference to the remaining portions of the specification and drawings.

DESCRIPTION OF A REPRESENTATIVE EMBODIMENT

System and Bus Overview

Figure 1A:
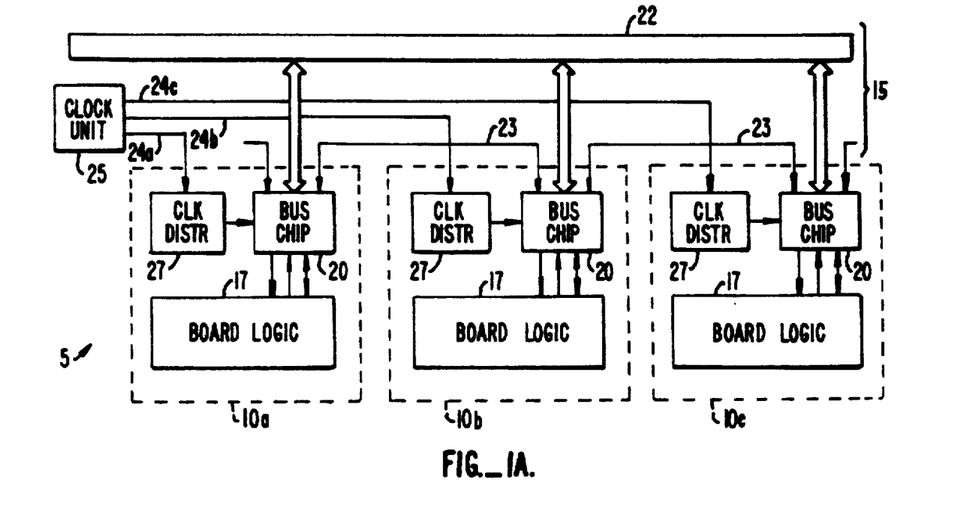
FIG. 1A is a high level block diagram of a computer system utilizing the slot determination technique of the present invention.

FIG. 1A is an overall block diagram illustrating a computer system 5 in which a plurality of functional units 10 communicate with each other over a system bus 15. In a representative embodiment, there may be up to fifteen such units, implemented on circuit board connected to a backplane having traces defining the bus. Each functional unit includes a portion, referred to as board logic 17, which may be regarded as the functional unit proper. A bus interface portion, implemented as a single ECL VLSI chip, referred to as bus chip 20, interfaces the board logic to the bus. In the particular embodiment described herein, all bus control and data paths for any functional unit which connects to the bus are contained in bus chip 20.

For illustrative purposes, a system having three such units, designated 10a, 10b, and 10c will be described. In a typical system, at least one of the functional units is a CPU, at least one is an I/0 processor, and at least one is a memory controller with associated memory.

System bus 15 includes a set of bi-directional differential signal lines 22, distributed in parallel to all the functional units, including:

| | |
|---|---|
| BusData(31 ... 0) | system data bus |
| BusPar | support odd parity over BusData |
| BusType(2 ... 0) | identifier tag for BusData |
| BusAck | provide acknowledgment mechanism |

Table 1 shows the encoding for BusType.

In addition, the backplane includes a set of traces 23, which connect the units in a daisy chain manner for slot determination, and sets 24a-c of clock lines, radially distributed to units 10a-c from a clock unit 25. Lines 24 communicate to a clock distribution network 27 on each unit.

Figure 1B:
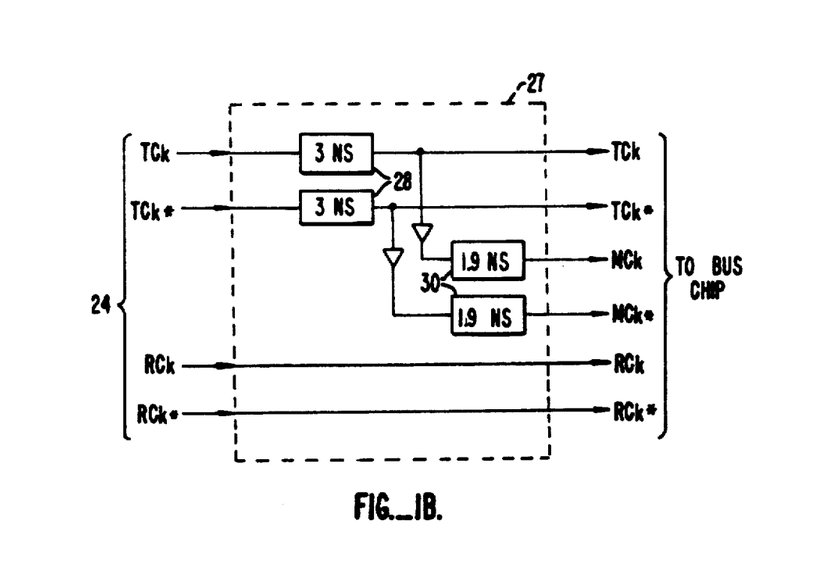
FIG. 1B is a block diagram showing the clock distribution to the bus chip.

FIG. 1B is a block diagram of clock distribution network 27. Clock lines 24 include signals designated TCk and RCk (and their logical complements TCk* and RCk*), which are distributed with constant delay traces on the backplane to all units. TCk and RCk are 12.5-ns, 50% duty cycle clocks. RCk is delayed relative to TCk by 5 ns at the point where they arrive at clock distribution network 27. RCk and RCk* are communicated to bus chip 20 without further delay. TCk and TCk* are delayed by 3-ns delay lines 28 before reaching bus chip 20. The delayed versions of TCk and TCk* are also buffered and delayed by 1.9-ns delay lines 30 to define a complementary pair of signals MCk and MCk*. The maximum skew between different TCk and RCk signals (at the bus chip) is ±0.5 ns.

The delay of RCk relative to TCk allows the data on the bus to be partially overlapped, i.e., to take more than a 12.5-ns cycle to propagate from driver to receiver. All bus drivers use TCk to clock output signals and all bus receivers use RCk to clock the input registers for data from the bus.

Figure 1C:
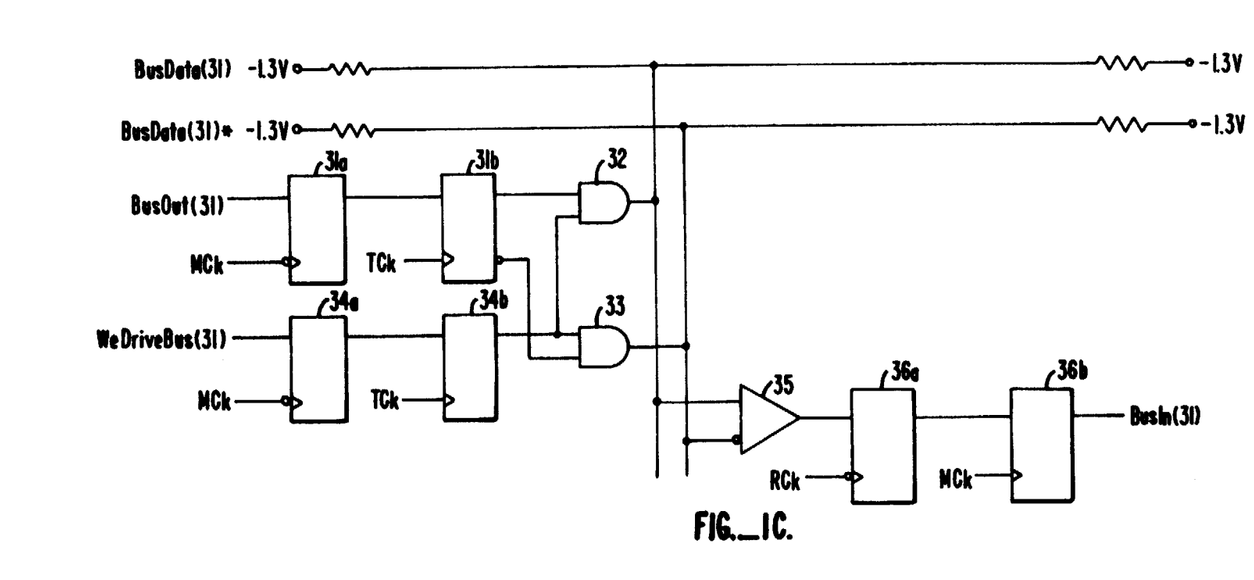
FIG. 1C is a block diagram showing the bus drivers and receivers in the bus chip.

FIG. 1C is a block diagram showing the circuitry for driving and receiving signals on one of signal lines 22, say BusData(31). The bus is a differential bus and includes a complementary line pair, in this case, BusData(31) and BusData(31)*. With two exceptions set forth below, the bus lines in each pair are terminated at −1.3 volts.

An internal signal WeDriveBus(31) specifies that bus pair no. 31 will be driven with the value defined by another internal signal BusOut(31). BusOut(31) drives a first master-slave flip-flop defined by latches 31a and 31b, the complementary outputs of which are communicated to respective first inputs of AND gates 32 and 33. WeDriveBus(31) drives a second master-slave flip-flop defined by latches 34a and 34b, the output of which drives both second inputs of the AND gates 32 and 33. The outputs of AND gates 32 and 33, which are guaranteed to be complementary, are coupled to BusData(31) and BusData(31)*. A true value at one of the AND gate outputs drives a signal of about 0.7 volts on the line to which is connected, while a false value results in no drive. Latches 31a and 34a are clocked by the falling edge of MCk while latches 31b and 34b are clocked by the rising edge of TCk. Each latch is characterized in that it holds the value when its clock input is low, and becomes transparent when its clock input is high.

Signals in from the bus are communicated to the respective inputs of a differential receiver 35 and to a master slave flip-flop defined by latches 36a and 36b. Latch 36a is clocked by the falling edge of RCk and latch 36b is clocked by the rising edge of MCk. The output of latch 36b is a signal BusIn(31) that is communicated to other portions of the bus chip.

Figure 1D:
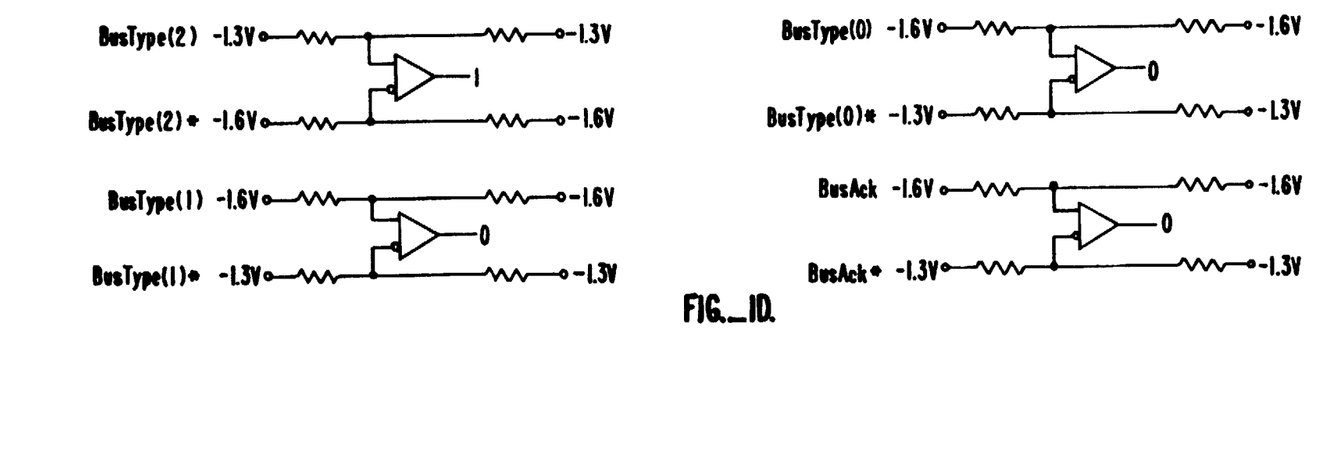
FIG. 1D shows a special termination scheme for selected bus lines.

FIG. 1D shows a special termination scheme for certain of the bus line pairs, namely those for BusType(2..0) and BusAck. As noted above, most of the bus pairs have both lines terminated at −1.3 volts, so that when no unit drives them, the bus value is undefined.

However, it is important that the pairs for BusType(2..0) and BusAck provide a defined value, even if no unit drives them. To provide default values, one line in each pair is terminated at −1.6 volts. More particularly, BusType(2)*, BusType(1), BusType(0), and BusAck are terminated at −1.6 volts, so that BusType and BusAck assume default values of 100 and 0, respectively.

Slot Determination

As alluded to above, each functional unit has an associated position on the bus. According to the present invention, each bus chip includes circuitry for engaging in a protocol that allows it to determine its position on the bus and the total number of functional units on the bus. To support this protocol, each bus chip includes a pair of terminals BusLeft and BusRight. Backplane traces 23 provide connections so that each unit's BusRight terminal is connected to the BusLeft terminal of the unit immediately to its right, except that the BusLeft terminal of the first unit is connected to a system reset and the BusRight terminal of the rightmost unit is not connected to anything.

Figure 2:
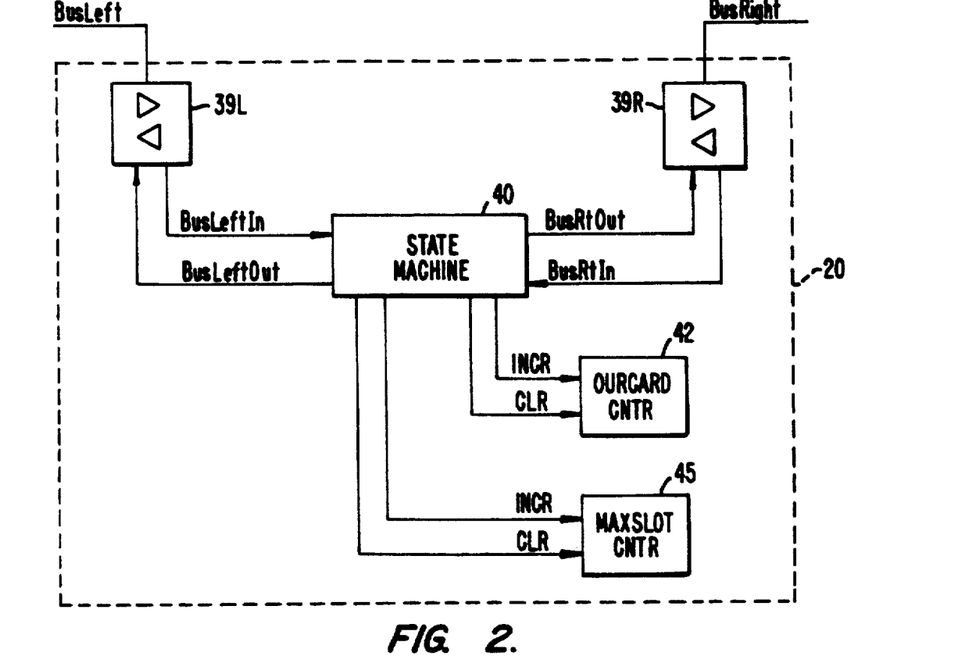
FIG. 2 is a block diagram of circuitry within each bus chip for determining the relative position of the circuit board on which that bus chip is located.

FIG. 2 is a block diagram illustrating the portion within one of bus chips 20 for performing the slot determination. BusLeft and BusRight are bi-directional signals having associated transceivers 39L and 39R. In receive mode, the left receiver receives the signal on BusLeft and provides an internal signal BusLeftIn while the left driver responds to an internal signal BusLeftOut and drives BusLeft. Similarly, the right receiver, when receiving BusRight provides an internal signal BusRtIn, and when driving responds to an internal BusRtOut signal to drive BusRight. BusLeftIn, BusLeftOut, BusRtIn, and BusRtOut communicate with a state machine 40 which controls a pair of counters 42 and 45, designated OurCard and MaxSlot.

While the details of the states and the state transitions will be described below, the operation will first be described in order to facilitate understanding. For initial purposes, it suffices to note that there are three basic state types, forward (F0, F1, and F2) where the state machine listens on BusLeft and drives BusRight; all drive (D) where the state machine drives on BusLeft and BusRight; and reverse (R0, R1, and R2) where the state machine listens on BusRight and drives on BusLeft. Certain of the states cause one or both of counters 42 and 45 to be initialized and incremented.

Figure 3:
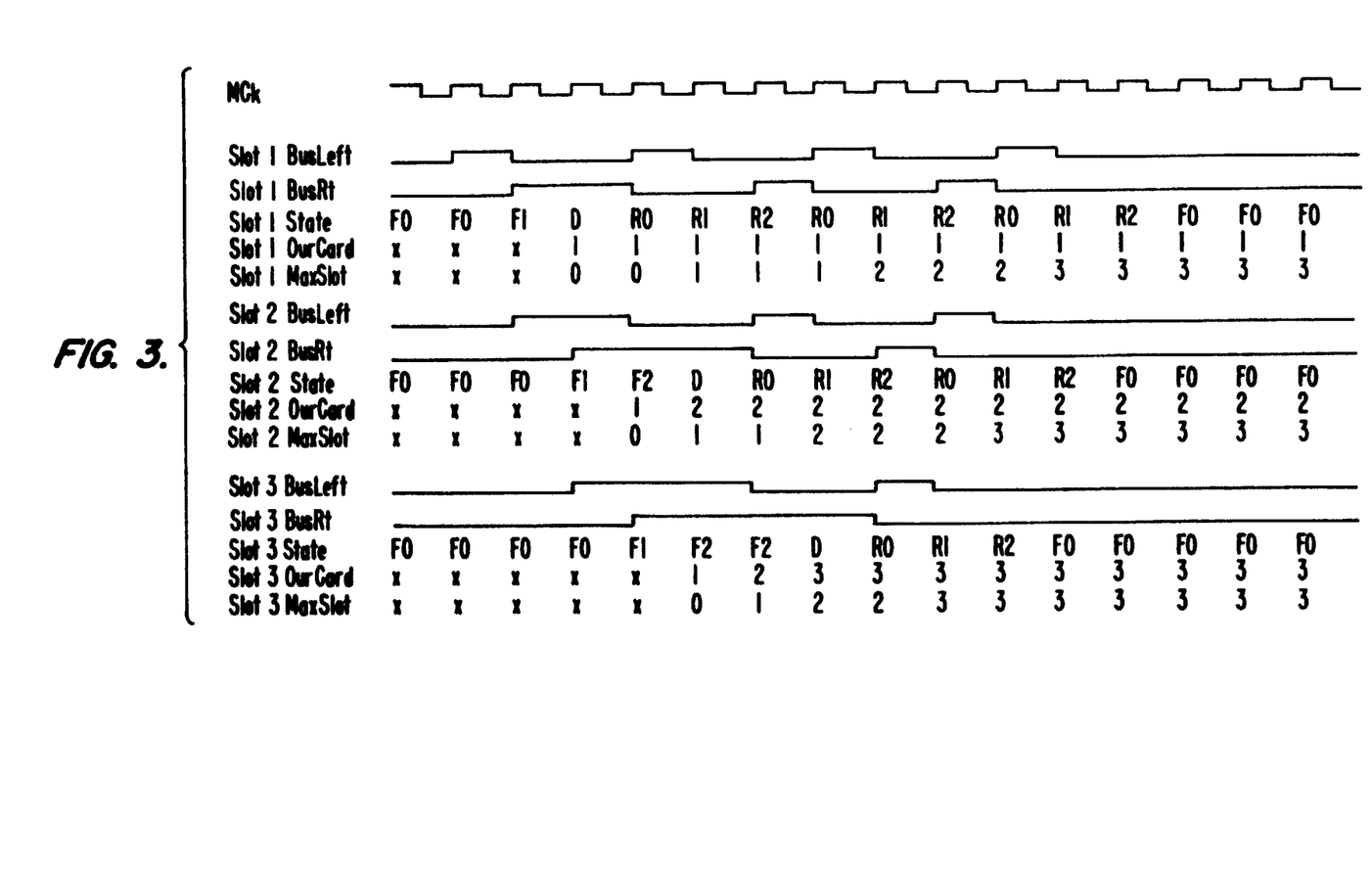
FIG. 3 is a timing diagram illustrating the operation of the present invention.

FIG. 3 is a timing diagram illustrating the sequence of pulses and state transitions for bus chips 20a (slot 1), 20b (slot 2), and 20c (slot 3). In brief, a 1-cycle reset pulse is applied to BusLeft for slot 1. Commencing with the first cycle following the first occurrence of a 1 on BusLeft, unit 1 drives a 1 on BusRight for two cycles, and then drives a 1 on BusLeft for one cycle. Slot 1 then listens on BusRight for pulses coming upstream (generated by downstream units as will be discussed below), and echoes these pulses by driving them out on BusLeft. In general, each unit, on initially receiving a pulse of a certain duration on BusLeft delays one cycle and then drives a 1 on BusRight for one cycle longer than the pulse it received, and then drives a 1 on BusLeft for one cycle. Thus, counting the number of cycles that a 1 is incoming on BusLeft gives the unit's slot number. As soon as the unit sees the end of the first pulse stream, and reverses its direction so that it listens on BusRight and drives BusLeft, it need only count the number of pulses incoming on BusRight to know the number of downstream units. Once a predetermined number of cycles of silence on BusRight are detected, the slot number and the total number of slots are known. When unit 1 detects the end of this sequence, it asserts a BusAck signal on system bus 15, which synchronizes all processors and allows the reset sequence to continue.

Figures 4, 4B:
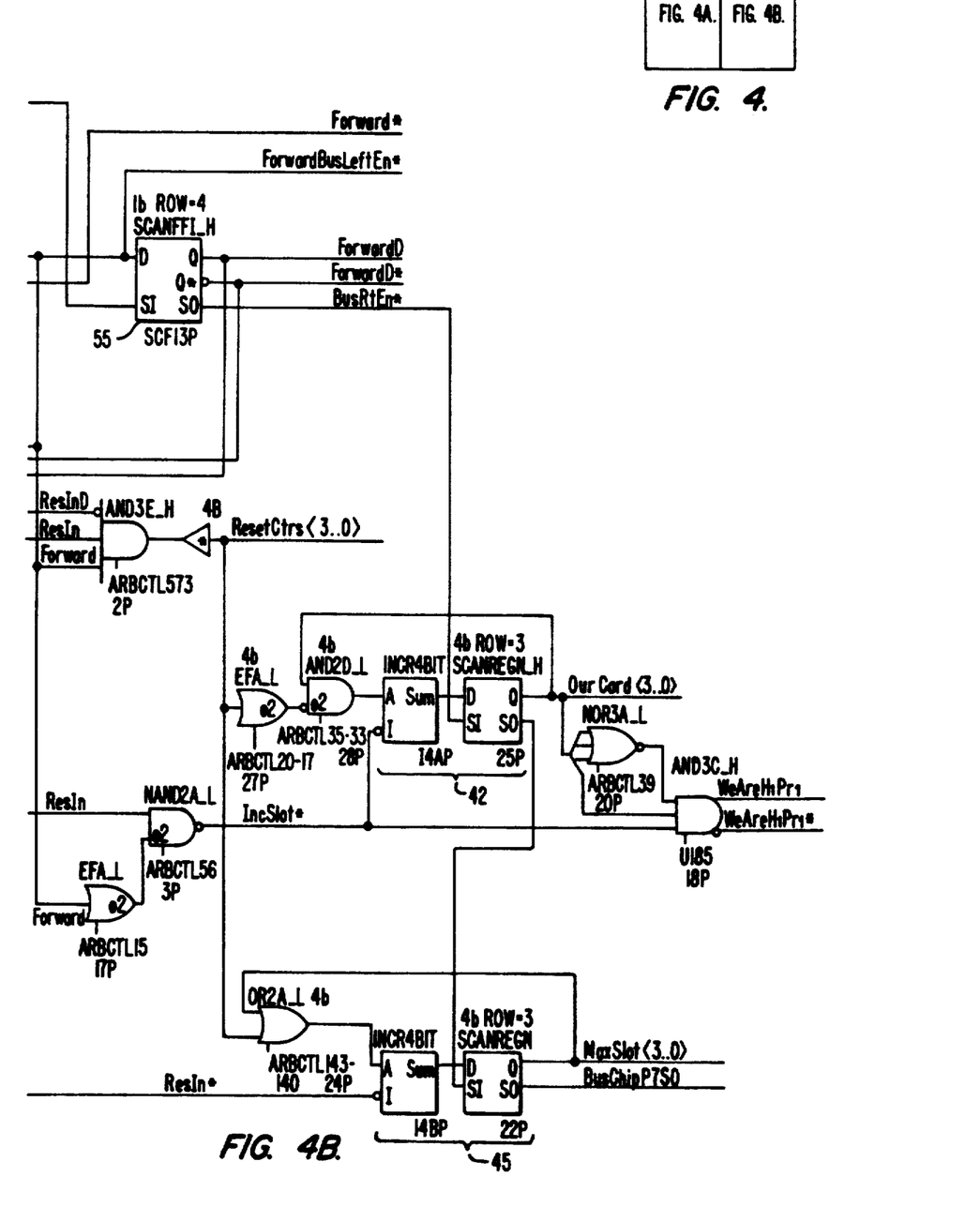
FIGS. 4A and 4B together provide a circuit schematic of the state machine in the bus chip circuitry.
Figure 4A:
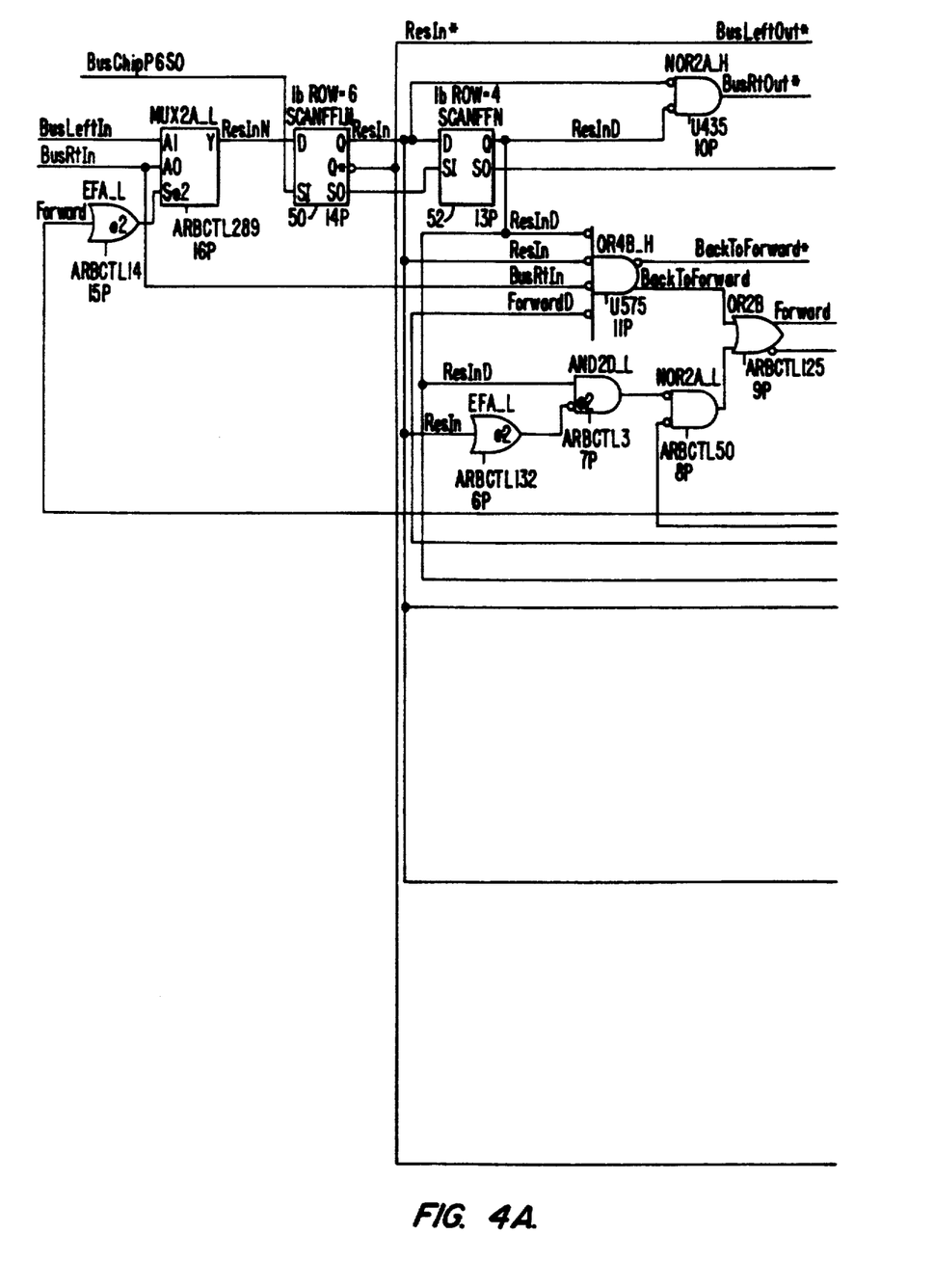

FIGS. 4A and 4B together provide a circuit schematic of one implementation of state machine 40, along with counters 42 an 45. Each counter includes an incrementer and a register. The state machine is characterized by three state bits, designated ResIn, ResInD, and ForwardD, which are the outputs of respective flip-flops 50, 52, and 55. ResIn is a state bit that designates that a logical 1 is being detected on BusLeftIn or BusRtIn (depending on whether the state machine is in the forward or reverse mode). ResInD is a one-cycle delayed version of ResIn, and is a necessary condition for switching from the reverse to the forward mode. ForwardD is a one-cycle delayed version of a signal Forward. Forward denotes that the machine is in its forward mode where it listens on BusLeftIn and drives BusRtOut. Table 2 is a state table for state machine 40.

Figure 5:
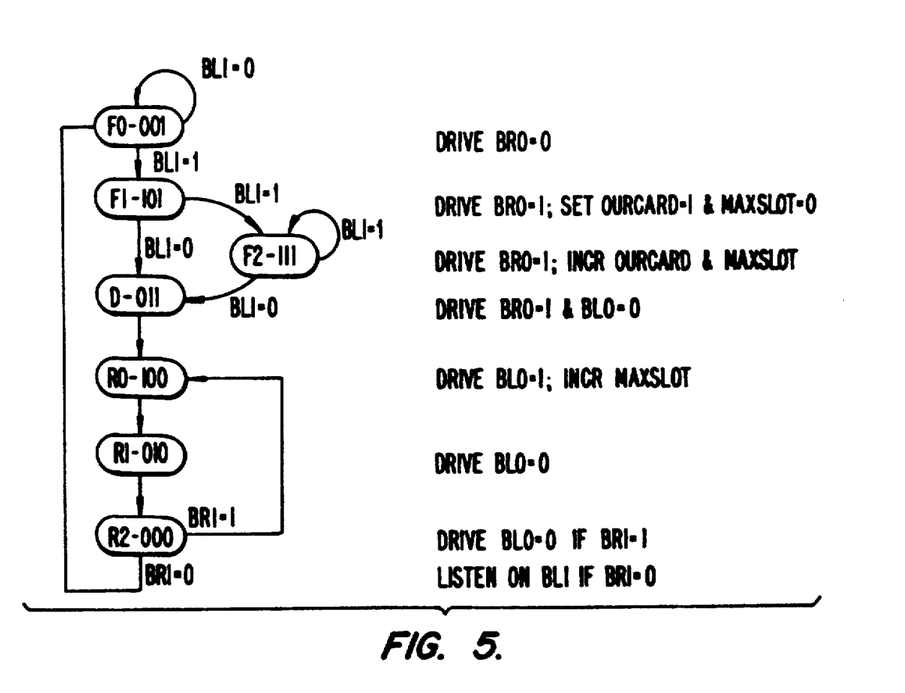
FIG. 5 is a state transition diagram for the state machine in the bus chip circuitry.

FIG. 5 is a state transition diagram for state machine 40. As discussed above, the machine can be thought of as executing two sequences. In the first sequence, it (a) listens upstream, and (b) passes what it hears, lengthened by one cycle, downstream. This sequence provides each unit with enough information to determine its slot number. In the second sequence, it (a) sends a one-cycle pulse upstream, (b) listens downstream, and (c) sends what it hears (from downstream) upstream. This sequence provides each unit with additional information it needs to determine the total number of units in the system.

Consider the first sequence. Initially, the machine is in state F0, in which it listens on BusLeftIn and drives a 0 on BusRtOut. The machine remains in state F0 as long as BusLeftIn remains at a 0. In this state, the state bits are 001. When BusLeftIn goes to 1, the state machine switches to state F1 (state bits 101) on the following cycle. In state F1 it continues listening on BusLeftIn and drives a 1 on BusRtOut, sets OurCard counter 42 to 1, and sets MaxSlot counter 45 to 0. If BusLeft In remains at 1 for at least one more cycle, the machine switches to state F2 (state bits 111), where it continues to drive a 1 on BusRtOut and increments both counters. For each cycle that BusLeftIn remains in this state, the machine continues to drive a 1 on BusRtOut and increments both counters. When BusLeftIn goes to 0 (whether the machine is in state F1 or F2), the machine switches to state D (bus bit 011) on the following cycle. In state D, it drives a 1 on BusRtOut and a 0 on BusLeftOut.

The machine then executes the second sequence. On the next cycle, the machine switches to state R0 (state bits 100) where it drives a 1 on BusLeftOut and increments MaxSlot counter 45. On the next cycle, the state machine switches to state R1 where it continues to listen on BusRtIn and drives a 0 on BusLeftOut. On the next cycle, state machine switches to state R2 (state bits 000) where it drives a 0 on BusLeftOut and continues listening on BusRtOut if it detects a 0. If BusRtIn is 1, the state machine switches to state R0 and undergoes the R0, R1, R2 sequence. Otherwise, if BusRtIn is 0, the machine enters the F0 state. Given the sequence of what is driven upstream, BusRtIn is 0 for the R0 and R1 cycles, so that a 0 on BusRtIn during the R2 cycle guarantees that no more pulses will be received on BusRtIn.

Conclusion

In conclusion, it can be seen that the present invention provides an efficient and effective technique for slot self-determination.

While the above is a complete description of the preferred embodiments of the invention, various alternatives, modifications, and equivalents may be used. For example, while the preferred embodiment determines slot position and total number of slots, it would also be possible to determine the slot number and the number of downstream slots. Therefore, the above description should not be taken as limiting the scope of the invention which is defined by the appended claims.

TABLE 1

| BusType (2...0) | BusType Encoding Interpretation | |
|---|---|---|
| | Master to Slave | Slave to Master |
| 000 | NoData | NoData |
| 001 | Command | SlvErr1 |
| 010 | Data | Data |
| 011 | Data + Switch | Data + Switch |
| 100 | BadData | SlvErr2 |
| 101 | Command | SlvErr3 |
| 110 | Data + WriteDisabled | Data |
| 111 | Data + WriteDisabled + Switch | Data + Switch |

TABLE 2

| Current State | State Bits | Input/Output Action | State Machine NEXT STATE | | | | Counter Action |
|---|---|---|---|---|---|---|---|
| | | | BusLeftIn | | BusRtIn | | |
| | | | 0 | 1 | 0 | 1 | |
|---|---|---|---|---|---|---|---|
| F0 | 001 | (Listen on BL, Drive BR = 0) | F0 | F1 | x | x | |
| F1 | 101 | (Listen on BL, Drive BR = 1) | D | F2 | x | x | Set MySlot = 1; Set MaxSlot = 0 |
| F2 | 111 | (Listen on BL, Drive BR = 1) | D | F2 | x | x | Increment MySlot, and MySlot |
| D | 011 | (Drive BL = 0, Drive BR = 1) | R0 | R0 | R0 | R0 | |
| R0 | 100 | (Drive BL = 1, Listen on BR) | R1 | R1 | R1 | R1 | Increment MaxSlot |
| R1 | 010 | (Drive BL = 0, Listen on BR) | R2 | R2 | R2 | R2 | |
| R2 | 000 | (Drive BL = 0, Listen on BR) | x | x | F0 | R0 | |

What is claimed is:

1. A bus interface unit for use in a data processing system wherein a number of such units are connected to a bus, comprising:

means defining an input, called the BusLeft input, an output, called the BusRight output, an input, called the BusRight input, and an output, called the BusLeft output;

first means, responsive to receiving a first number of pulses on said BusLeft input, for driving a first modified number of pulses on said BusRight output; and second means, responsive to receiving a second number of pulses on said BusRight input, for driving a second modified number of pulses on said BusLeft output; and means, responsive to said first and second numbers, for determining the relative position on the basis of said first and second numbers.

2. The bus interface unit of claim 1 wherein said first modified number is 1 more than said first number.

3. The bus interface unit of claim 1 wherein said second modified number is 1 more than said second number.

4. In a data processing system that includes a plurality of functional units connected to a bus, a method wherein each unit on the bus determines its relative position and the total number of units on the bus, comprising the steps, carried out by each unit, of:

receiving a first number of pulses at an input, called the BusLeft input;

sending a first modified number of pulses on an output, called the BusRight output;

receiving a second number of pulses at an input, called the BusRight input;

sending a second modified number of pulses on an output, called the BusLeft output; and determining at least one relative position on the basis of the first and second numbers.

5. The method of claim 4 wherein the first modified number is 1 more than the first number and the second modified number is 1 more than the second number.

6. The method of claim 4 wherein a part of said second-mentioned sending step is performed before the second-mentioned receiving step.

7. In a data processing system that includes a plurality of units connected to a bus, a method wherein a functional unit on the bus determines its relative position and the total number of units on the bus, comprising the steps, carried out by each unit, of:

determining the number n of pulses received at an input, called the BusLeft input;

communicating (n+1) pulses to an output, called the BusRight output;

thereafter, communicating a single pulse on an output, called the BusLeft output; and thereafter, determining the number of pulses received on an input, called the BusRight input, and transmitting the same number of pulses on the BusLeft output;

whereupon when each unit's BusLeft input and output are connected to the BusRight output and input of the unit to the left, if any, and a single pulse is applied to the BusLeft input of the first input, the number of pulses received in a given unit's BusLeft input corresponds to the slot number of that unit and where the total number of pulses received on the given unit's BusLeft input and its BusRight input corresponds to the total number of units in the system.

8. A bus interface unit for use in a data processing system wherein a number of such units are connected to a bus comprising:

means defining an input, called the BusLeft input, an output, called the BusRight output, an input, called the BusRight input, and an output, called the BusLeft output;

means, responsive to receiving n pulses on said BusLeft input, for driving (n+1) pulses on said BusRight output and a single pulse on said BusLeft output;

means, responsive to receiving pulses appearing on said BusRight input, for driving a like number of pulses on said BusLeft output;

means for counting the number of pulses received on said BusLeft input; and means for counting the total number of pulses received on said BusLeft input and said BusRight input;

whereupon when the units are connected in a daisy chain manner with the BusLeft input and output of each unit connected to the BusRight output and input of its left neighbor (if any) and the BusRight input and output connected to the BusLeft output and input of its right neighbor (if any), and a single pulse is applied to the BusLeft input of the leftmost unit, the number of pulses detected at a given unit's BusLeft input provides a number representing a relative position for that unit and the total number of pulses detected at the given unit's BusLeft input and BusRight input provides the total number of units in the system.

9. A computer system comprising:

a bus;

a plurality of units coupled to said bus, each unit having an input, called the BusLeft input, an output, called the BusRight output, an input, called the BusRight input, and an output, called the BusLeft output, each unit's BusLeft input and output being connected to the BusRight output and input of the unit to the left, if any;

first means, associated with each unit and responsive to receiving a first number of pulses on that unit's BusLeft input, for driving a first modified number of pulses on that unit's BusRight output;

second means, associated with each unit and responsive to receiving a second number of pulses on that unit's BusRight input, for driving a second modified number of pulses on that unit's BusLeft output; and means, associated with each unit and responsive to said first and second numbers, for determining that unit's relative position on said bus.

10. The bus interface unit of claim 9 wherein said first modified number is 4 more than said first number.

11. The bus interface unit of claim 9 wherein said second modified number is 4 more than said second number.

12. A computer system comprising:
a bus;
a plurality of units coupled to said bus, each unit having an input, called the BusLeft input, an output, called the BusRight output, an input, called the BusRight input, and an output, called the BusLeft output, each unit's BusLeft input and output being connected to the BusRight output and input of the unit to the left, if any;

means, associated with each unit and responsive to receiving n pulses on that unit's BusLeft input, for driving (n+1) pulses on that unit's BusRight output and a single pulse on that unit's BusLeft output;

means, associated with each unit and responsive to receiving pulses appearing on that unit's BusRight input, for driving a like number of pulses on that unit's BusLeft output;

means, associated with each unit, for counting the number of pulses received on that unit's BusLeft input; and means, associated with each unit, for counting the total number of pulses received on that unit's BusLeft input and said BusRight input;

whereupon when a single pulse is applied to the BusLeft input of the leftmost unit, the number of pulses detected at a given unit's BusLeft input provides the slot number for that unit and the total number of pulses detected at the given unit's BusLeft input and BusRight input provides the total number of units in the system.

* * * * *